US012617160B2

(12) United States Patent
Pospisek et al.

(10) Patent No.: US 12,617,160 B2
(45) Date of Patent: May 5, 2026

(54) VARIABLE FREQUENCY MICROWAVE JOINING

(71) Applicant: Magna Exteriors Inc., Aurora (CA)

(72) Inventors: Marek Pospisek, Banbury (GB); Zdenek Severa, Troy, MI (US)

(73) Assignee: Magna Exteriors Inc., Aurora (CA)

( * ) Notice: Subject to any disclaimer, the term of this patent is extended or adjusted under 35 U.S.C. 154(b) by 125 days.

(21) Appl. No.: 18/497,220

(22) Filed: Oct. 30, 2023

(65) Prior Publication Data

US 2024/0140045 A1 May 2, 2024

Related U.S. Application Data

(60) Provisional application No. 63/420,153, filed on Oct. 28, 2022.

(51) Int. Cl.
| | |
|---|---|
| *B29C 65/48* | (2006.01) |
| *B29C 35/08* | (2006.01) |
| *B29K 63/00* | (2006.01) |
| *B29L 31/30* | (2006.01) |

(52) U.S. Cl.
CPC ...... *B29C 65/4845* (2013.01); *B29C 65/4865* (2013.01); *B29C 2035/0855* (2013.01); *B29K 2063/00* (2013.01); *B29L 2031/30* (2013.01)

(58) Field of Classification Search
CPC ............ B29C 65/4845; B29C 65/4865; B29C 2035/0855; B29C 65/1425; B29C 66/1122; B29C 66/30321; B29C 66/43; B29C 66/45; B29C 66/73921; B29K 2063/00; B29L 2031/30
See application file for complete search history.

(56) References Cited

U.S. PATENT DOCUMENTS

| | | | | |
|---|---|---|---|---|
| 5,667,868 A | * | 9/1997 | Freeman | ................ B60J 5/0481 |
| | | | | 428/167 |
| 2011/0098382 A1 | * | 4/2011 | Czaplicki | ............. C08G 59/186 |
| | | | | 523/466 |
| 2013/0309436 A1 | * | 11/2013 | Vanimisetti | ......... B29C 66/1122 |
| | | | | 428/57 |

(Continued)

OTHER PUBLICATIONS

Messler et al., "Integral Micro-Mechanical Interlock (IMMI) Joints for Polymer Matrix Composite Structures", J. Thermoplastic Composite Materials, vol. 11, May 1998, https://journals.sagepub.com/doi/epdf/10.1177/089270579801100301. (Year: 1998).*

(Continued)

*Primary Examiner* — Christopher W Raimund

(57) ABSTRACT

Bonded untreated plastic substrates and process for manufacturing same, including a variable frequency microwave and variable frequency microwave active welding paste. Use of 1-component variable frequency microwave cured paste adapted to wet and bond untreated plastic substrates that is operable to reduce production cycle time, reduce production costs, reduce operating costs, and reduce production line space. Hardening of the welding paste allows joining of thermoplastic panels quickly without the need for panel surface treatment. Polypropylene substrate bonding with 1-component epoxy adhesive that is variable frequency microwave reactive, wherein the substrates are untreated.

19 Claims, 2 Drawing Sheets

(56) References Cited

U.S. PATENT DOCUMENTS

2020/0009949  A1*    1/2020   Tichy  ............... B29C 66/73921

OTHER PUBLICATIONS

Masterbond, "Infographic on Masterbond EP17HT-LO", Jun. 14, 2014, https://www.masterbond.com/infographic/master-bond-ep17ht-lo-infographic. (Year: 2014).*
Tawlarkar et al., "Effect of grooves on adhesively bonded joints", Intl J. Res. Aero. Mech. Eng., vol. 5, Issue 1, Jan. 2017, pp. 1-13. (Year: 2017).*

* cited by examiner

VARIABLE FREQUENCY MICROWAVE JOINING

CROSS-REFERENCE TO RELATED APPLICATIONS

This application is a Non-Provisional patent application and claims benefit of U.S. Provisional Patent Application No. 63/420,153, filed Oct. 28, 2022. The disclosures of the above application are incorporated herein by reference.

FIELD OF THE INVENTION

The present invention relates to a variable frequency microwave (VFM) joining, in particular bonding untreated plastic substrate.

BACKGROUND OF THE INVENTION

Common adhesive that must be cured for joining panels is known to be problematic.

Accordingly, there is a need for features on at least one panel in combination with variable frequency microwave joining operable to help weld plastic panels with predetermined paste faster and with higher force to provide a properly sealed connection, eliminate bond-line read through, match thermoplastic properties of materials, and reduce costs and manufacturing space.

SUMMARY OF THE INVENTION

The present invention is directed to bonded untreated plastic substrates and process for manufacturing same, including a variable frequency microwave and variable frequency microwave active welding paste operably adapted to achieve a predetermined lean assembly process, significantly reduce footprint of predetermined assembly equipment, reduce capital and predetermined tooling costs, and simplify assembly processes. Use of 1-component variable frequency microwave cured paste adapted to wet and bond untreated plastic substrates that is operable to reduce production cycle time, reduce production costs, reduce operating costs, and reduce production line space. Hardening of the welding paste allows joining of thermoplastic panels quickly without the need for panel surface treatment. Polypropylene substrate bonding with 1-component epoxy adhesive that is variable frequency microwave reactive, wherein the substrates are untreated.

The present invention is generally directed to substrate bonding, e.g., welding, liftgate panels welding, automotive parts bonding line, etc. In particular, welding via variable frequency microwave joining (VFM) reactive paste. The present invention incorporates a predetermined suitable adhesive, e.g., welding paste, 1-component epoxy resin, compounded with fillers and additives for desired mechanical properties. This novel method of hybrid welding via reactive paste ensures that low surface energy substrates such as polypropylene can form high performance structural joints without additional surface preparation.

In accordance with aspects of the present invention, it is found that VFM (microwaves) in the range of 5.8 to 6.2 GHz are able to rapidly increase the temperature of microwave absorbent material (welding paste) within a few seconds without absorbing in to neither the substrates nor surrounding fixturing. Heat absorbed by paste melts the substrate in contact with the paste and the adhesive paste merges with the melted substrate forming the join similar to the weld of thermoplastic material. Hardening of the welding paste allows joining of thermoplastic panels in a very short time (e.g., about 20 seconds), without the need for additional processes as a solvent cleaning and panel surface treatment (plasma, flaming, primer, adhesion promoter) that are traditionally required in thermoplastic bonding process. Technology requirements in accordance with aspects of the present invention include that a new generation of VFM machine is developed as well as VFM active welding paste. Benefits in accordance with aspects of the present invention include achieving a lean assembly process, significantly reduced footprint of the assembly equipment, capital and tooling cost, and simplified assembly process.

In addition, the present invention's VFM joint is different than a common adhesive joint for at least the reasons that the present invention includes ribs on each panel on the join area of each panel that reduces welding time and increases strength of join and that helps weld plastic panels with paste faster and with higher force.

The present invention of 1-component epoxy resin compound also offers possibility to join different material combinations of thermoplastic materials.

Furthermore, 1-component epoxy resin is compounded with modified rubbers with terminal carboxyl groups, polypropylene filler and polypropylene glycol to provide flexible join as well as similar CLTE between the substrates and paste.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
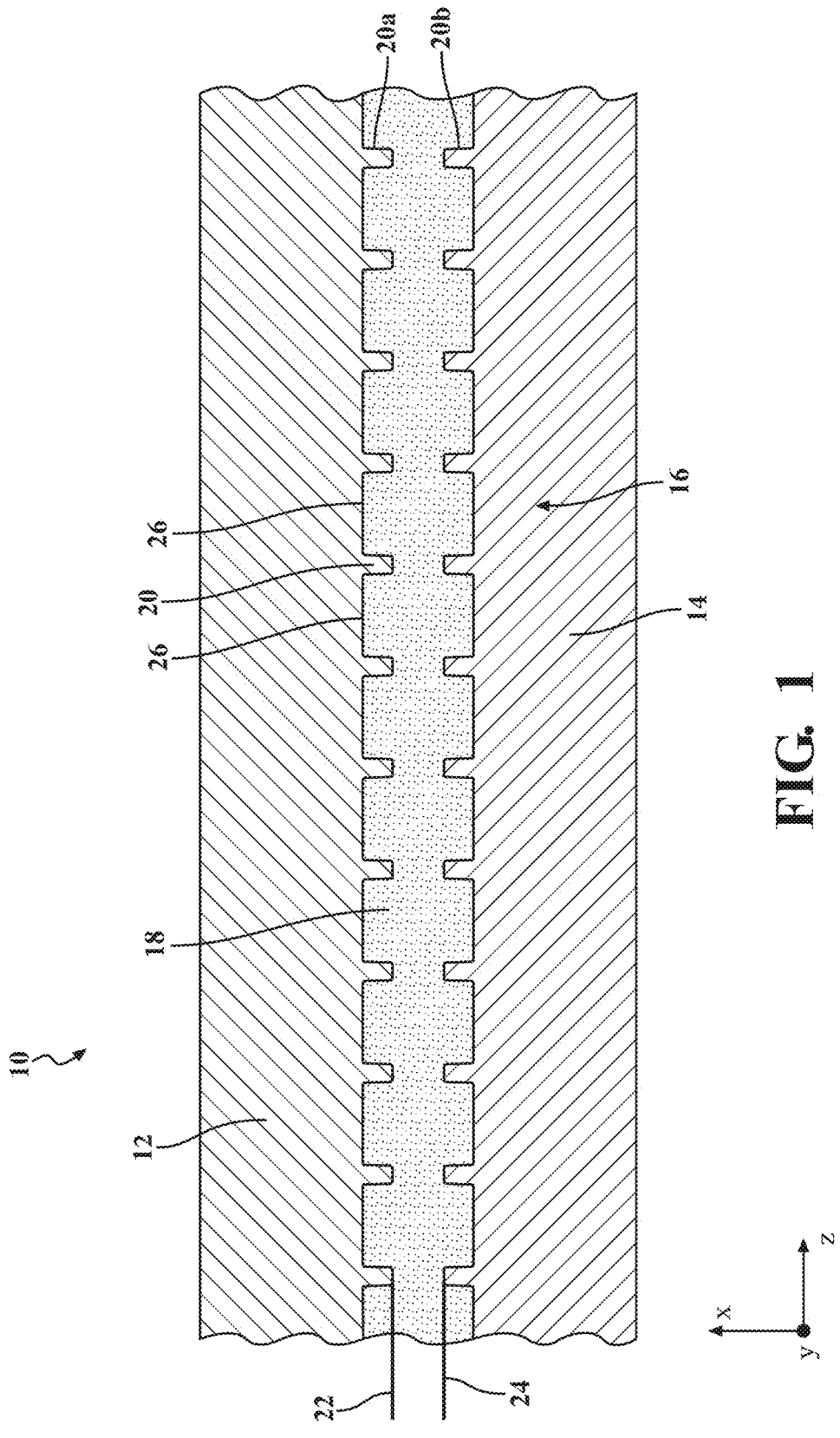
FIGS. 1-2 are cross sections of an exemplary substrate joint including ribs and VFM joining paste, in accordance with the present invention.
Figure 2:
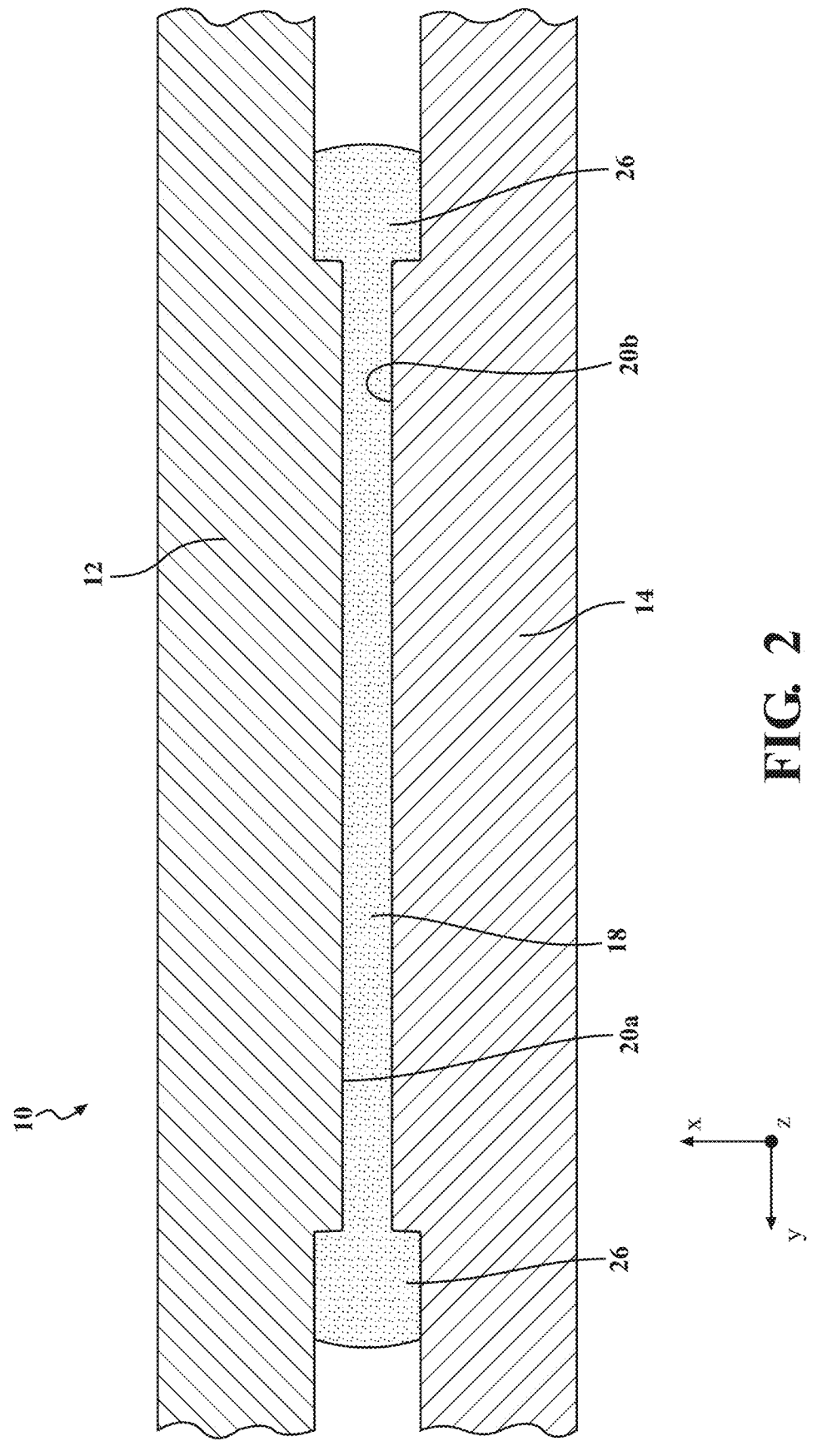

Referring to FIGS. 1-2 generally, the present invention provides an assembly, indicated generally at 10, incorporating at least one first panel 12 (e.g., inner panel) coupled to at least one second panel 14 (e.g., outer panel) by at least one joint, indicated generally at 16, and a method for manufacturing same. Further in accordance with the present invention, a predetermined welding paste 18 is used for the joint 16, and variable frequency microwave ("VFM") joining. The VFM joint 16 of the present invention is further superior from a common adhesive joint, in that the present joint 16 also includes a plurality of ribs 20, operably formed on at least one of the first or second panels 12 and/or 14, that helps in the welding of the panels (e.g., plastic panels) with the paste 18 faster (e.g., in about 20 seconds) and with predetermined higher force. These are significant advantages over common adhesive joints.

The paste 18 is generally a VFM cured paste, according to aspects of the present invention. Most preferably, a 1-component epoxy resin. The 1-component VFM cured paste of the present invention is capable to wet and bond untreated plastic substrates, which can allow following benefits to a production plant: Reduction of production cycle time—no surface pre-treatment time (flaming, plasma, primer or adhesion promoter); elimination of solvent cleaning; Reduction of the production costs for the automotive parts bonding line—no surface pre-treatment equipment is needed (flaming, plasma); Reduction of operating costs—elimination of gas and electricity demand for the substrate pre-treatment; Clearing the work area—No space requirement for the installation of surface pre-treatment equipment; Shortening of product manufacturing time due to elimination of adhesive post curing; Unlimited open time of the paste—no need for the air conditioning of production line to stabilize reaction condition and ensuring proper open time management; No need to air-condition the paste storage in the production hall (problem especially with acrylic adhesives where one component contains peroxides); Paste application at RT—no need to have tempered hoses to transport paste from the barrel to the application head; Achieving the handling strength depends only on the temperature of the paste after VFM treatment (The paste has to be able to hold the joint in the required dimensions after the bonder is opened after VFM application. This issue had to be taken into account in the formulation of the paste.); 1-component welding paste allows compensating dimensionally non-conforming components and meet high quality standards. This had to be taken into account in epoxy paste composition by adding mineral fillers that improves rheology and thixotropy of 1-component welding paste; the addition of mineral fillers in to 1-component welding paste is required to eliminate volume changes during VFM curing that would otherwise cause undesired read-throughs.

The paste 18 being a 1-component epoxy resin has preferred characteristics including: Epoxy formulation withstands at least about 5 minutes of heat exposure to at least about 270° C.; Thixotropic behaviour—an adhesive bead can be applied at about at least 4 mm thickness without excessive spillage; Epoxy resin has to be dispensed using conventional dispensing equipment; Application of paste with incorporated polypropylene (PP) particles is used in which PP particles are dispersed, an appropriate dosing head can be used due to these PP particles in the 1K epoxy; Safety and handling with the paste corresponds to working with epoxy resins; The bond strength of the paste 18 will be limited by the strength of the plastic bonded substrates, e.g., 12,14; VFM cured paste can handle long-term climate loading and pass required climatic tests in the automotive industry. Use of mineral fillers, thermoplastic fillers and readily available epoxy materials and additives allows for manufacturing at scale, future global adoption of technology, as well as low cost manufacturing compared to readily available adhesives. Epoxy material is selected to enhance microwave absorption in the range of 5.8 to 6.2 GHz to achieve high energy efficiency of joining process and low processing time (e.g., in about 20 seconds).

In addition to product performance advantages, there are several advantages of 1-component epoxy resins, according to aspects of the present invention. One part epoxy compositions can eliminate waste, there is no need for the static or dynamic mixing and wash outs are eliminated, decreases concerns regarding mix ratios, weighing, working life. Regular process tests (mix ratio testing, surface treatment testing, etc.) required for bonding are eliminated which can accelerate productivity. 1-component epoxy resin simplifies the manufacturing process, improves process control, reduces process failures which reduces risk to produce non-conforming join. In addition, storage of the paste can be done at temperatures between about 5° C. and 25° C., and the paste expiration time is longer, at about 3 to 12 months based on the predetermined used internal catalyst (e.g., Lewis acid BF3 complex catalyst, DICY, etc.).

According to aspects of the present invention, selectively modifying of epoxy resin to match predetermined thermomechanical properties of PP substrates has at least the following benefits: Increasing flexibility by reactive or polymer non-reactive flexibilizers for improving damping resistance; Reaching similar CLTE as PP substrates to eliminate tension through working temperature range; Decreasing surface tension of liquid resin to improve wetting to non-treated substrate. In addition, according to aspects of the present invention, predetermined catalyst system(s) (Lewis acid BF3 complex catalyst, DICY, etc. . . . ) has at least the following benefits: Resin type storage stability on the used catalyst; Reaching acceptable cure time for the production line—evaluation of catalyst dosage. In addition, according to aspects of the present invention, incorporation of a predetermined polypropylene (PP) into the epoxy resin. The PP granulate forms the connecting bridges between the individual panels 12,14 and a permanent bond is created. Here, the epoxy resin forms a sealant between the panels 12,14 and the PP bridges. Predetermined PP granulate grain size(s) affect melting speed and joint quality. Utilizes a predetermined adequate PP granulate type—unfilled/talc filled/LGF filled, etc.

The present invention also incorporates at least one additive of the welding paste 18 operably adapted to act as a softener in the joint 16 to match compatibility in predetermined mechanical properties and avoid undesired A-surface defects like read-throughs, sink marks, etc. of the panels 12,14 formed of predetermined material(s). By way of non-limiting example, incorporating polypropylene glycol, and/or CTBN modified liquid rubber, and/or tall oil fatty acids, etc, and any combinations thereof.

The present invention is adaptable depending on the particular applications for allowing the following: Ensuring proper sealed connection between untreated PP substrate and epoxy adhesive; Elimination of bond-line read through caused by partial melting of the substrate on the inner side; Elimination of volume changes during VFM curing by adding mineral filler; Matching predetermined thermomechanical properties of epoxy adhesive to PP substrate to minimize interfacial tension (CLTE, E-modulus, DMA curve).

According to aspects of the present invention, the ribs 20 of the panels are operably formed in at least one predetermined pattern compatable with the welding paste 18 and depending on the particular applications.

While the ribs 20 are depicted aligned straight, or along the same plane, it is understood that the ribs 20 can be formed to operably follow any predetermined geometry of the panel(s), e.g., contours, edges, angles, turns, wedges, ramps, plateau, raised channels, depressions, etc., without departure from the scope of the present invention. Further, application with structural member element joining is contemplated without departure from the scope of the present invention.

It is understood that the ribs 20 can be any predetermined alternative shape, angle, tapered, and spacing(s) and location (s), suitable attachment feature shapes/configurations, and any combinations thereof, depending on the application without departure from the scope of the present invention. While the ribs 20 are depicted as having uniform spacing between adjacent ribs 20, it is understood that spacing may vary, depending on the application, without departure from the scope of the present invention. Ribs 20 having at least one series of substantially uniform spacing and other spacing differing is contemplated depending on the application without departure from the scope of the present invention.

The first and second panels 12 and 14 are formed of predetermined material, which may be the same material or different from each other. The material is preferably a polypropylene.

The ribs 20 are formed as opposing features on the first and second panels 12 and 14, most preferably they are aligned (e.g., exemplary first rib 20a and second rib 20b. The joint 16 preferably includes a first rib line or plane 22 (e.g., inward facing first surface) and an oppositely disposed second rib line or plane 24 (e.g., inward facing second surface) appearing substantially identical. However, it is understood that the shape, spacing and geometry and locations may vary depending on the application without departure from the scope of the present invention. The joint 16 includes a plurality of gaps 26 between the ribs 20. The paste 18 fills the gaps and is also between the first and second panels 12 and 14.

Gaps 26 between adjacent ribs 20, 20 are substantially uniform. Alternatively, the gaps 26 may be operably adapted depending on the particular application to vary in either direction with respect to the horizontal and/or vertical planes.

The joints 16 are located at predetermined positions suitable for joining at least two panels 12,14 together depending on the particular applications. These joints 16 may be at a predetermined plurality of locations spaced throughout the assembly 10 such that the joints 16 are not continuous, or the joints 16 can be generally adjacent the peripheral edge of the assembly 10 forming a continuous joint 16, e.g., most preferably forming a weather resistant seal. The location(s) of the joint(s) 16 is/are adaptable depending on the parts being joined. It is understood that at least one joint 16 is formed at predetermined locations suitable for joining predetermined panels depending on the particular applications without departure from the present invention.

The final joints 16 are formed by VFM (microwaves), in accordance with the present invention, thereby allowing significantly increased temperature of microwave absorbent material (welding paste 18) within a few seconds. This can lead to hardening of the welding paste 18 that allow us to join panels 12,14 (e.g., thermoplastic panels) in a very short time (e.g., around about 20 s), without the need of panel surface treatment, which is a significant advantage over that conventionally known. The temperature increases are generally about 180 degrees Celsius to 270 degrees C. The welding paste 18 of the present invention withstands up to at least about 270 degrees C.

Furthermore, a predetermined VFM machine is provided operably adapted to apply and/or cure paste 18, as well as the VFM active welding paste 18 is provided, in accordance with the present invention. Benefits include achieving a lean assembly process, significantly reducing footprint of the assembly equipment, capital and tooling cost and simplify assembly process.

A predetermined VFM machine is provided adapted for use with VFM cured welding paste, in accordance with the present invention. Predetermined tooling is provided. The at least two panels 12 and 14 are operably formed with ribs 20, the welding paste 18 that is VFM activated paste is operably applied, panels 12,14 aligned with the paste 18 under predetermined force, and VFM applied for a predetermined time at a predetermined temperature to form the joint(s) 16 via variable frequency microwave (VFM) joining.

The present invention sets forth the exceptional combination of elements, including the welding paste 18, panel ribs 20, and VFM to form a strong joint faster and with higher force and adaptive to panel-to-panel gaps.

The assembly 10 is operably adaptable for any predetermined application without departure from the scope of the present invention. The assembly 10 is preferably an exterior panel assembly of predetermined material, e.g., thermoplastic, or module operably adapted for motor vehicles, such as, but not limited to, back doors, liftgates, drop gates, decklit modules, exterior panels, fenders, rear quarter panels, front grills, passenger doors: rear and front door modules, hoods and roof modules, tailgates, drop down/up tailgates, swing tailgates, pick-up tailgates, battery enclosures, hard tops, FIP/radar covers, active aero, fascia, trim, FEM, engineered glass, running boards, rocker panels, front quarter panels, bumpers, cabs, cargo lining, active-aerodynamic panels, battery pack enclosures, etc. Interior panel assemblies are also contemplated without departure from the scope of the present invention, e.g., instrument panels, floor consoles, cross car members, bezels, pillars, hard top panels, bulkheads, trim, panels, etc.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A substrate adapted for a vehicle, comprising:
a first panel formed of a first plastic material;
a second panel formed of the first plastic material or a second plastic material that is different than the first plastic material, said first and second panels are untreated at a plurality of joining areas; and
a predetermined 1-component VFM reactive welding paste located on said joining areas and hardened by VFM to thereby join said first and second panels together;
multiple ribs on each of said first and second panels, the ribs extend outwardly from the first and second panels and are operable to allow VFM curing of the welding paste faster, a first rib plane of said ribs on said first panel is spaced from a second rib plane of said ribs on said second panel such that the ribs of said first panel do not overlap the ribs of said second panel along said first and second rib planes and said 1-component VFM reactive welding paste is located between said first and second rib planes and between respective adjacent ribs along said first and second panels.

2. The substrate of claim 1, wherein the first and second panels are thermoplastic panels adapted for an exterior of a vehicle.

3. The substrate of claim 1 wherein the ribs of the first panel are provided on a minority of a surface area of the joining area of the first panel, and the ribs of the second panel are provided on a minority of a surface area of the joining area of the second panel.

4. The substrate of claim 1 wherein the 1-component VFM reactive welding paste is at least 4 mm thick in a direction extending between the first panel and second panel.

5. A method of bonding substrates adapted for a vehicle, comprising:

providing a Variable Frequency Microwave (VFM) machine;

providing a first plastic material for forming a first panel;

providing material for forming a second panel, where the material for forming the second panel is the same as the first plastic material or is a second plastic material that is different than the first plastic material;

providing a 1-component epoxy VFM cured welding paste;

forming the first and second panels with a ribs formed on both of the first panel and the second panel, said ribs operable to help to weld said first and second panels with said welding paste faster and with predetermined higher force;

applying the welding paste in at least one location on the first panel and/or second panel where a joining of the first and second panels is desired;

aligning the first and second panels with the welding paste in contact with said first and second panels, wherein a first rib plane of said ribs on said first panel is spaced from a second rib plane of said ribs on said second panel such that said first panel ribs do not overlap said second panel ribs along said first and second rib planes and said 1-component VFM cured welding paste is located between said first and second rib planes and between respective adjacent ribs along said first and second panels; and applying predetermined VFM (microwaves) to achieve a predetermined temperature to harden the welding paste to join the first and second panels.

6. The method of claim 5, wherein the welding paste includes microwave absorbent material.

7. The method of claim 5, wherein the first and second panels are thermoplastic panels adapted for an exterior of a vehicle.

8. The method of claim 5, wherein the welding paste is hardened to allow the joining of the first and second panels in about 20 seconds.

9. The method of claim 5, wherein the first and second panels are not surface treated prior to application of the welding paste and joining.

10. The method of claim 5, wherein the predetermined temperature is between 180 to 270 degrees Celsius.

11. The method of claim 5, wherein the welding paste includes at least one additive adapted to act as a softener.

12. The method of claim 5, wherein the first and second panels are thermoplastic panels.

13. The method of claim 5, wherein the first and second panels are polypropylene panels.

14. The method of claim 5, wherein the first and second panels are thermoplastic liftgate panels adapted for a vehicle.

15. The method of claim 5, wherein the first and second panels are exterior panels or module panels adapted for a vehicle.

16. The method of claim 5, wherein the welding paste can withstand up to at least about 270 degrees Celsius.

17. The method of claim 5, further comprising a predetermined tool nest adapted to hold the first and second panels under predetermined pressure or force during curing of the welding paste via variable frequency microwave (VFM) joining.

18. A method of bonding substrates adapted for a vehicle, comprising:

providing at least one first panel formed of a first plastic material and including at least one untreated joint area that includes attachment features in the form of ribs extending outwardly from an inner surface of the at least one first panel;

providing at least one second panel formed of the first plastic material or other a plastic material and including at least one untreated joint area that includes attachment features in the form of ribs projecting outwardly from an inner surface of the at least one second panel;

providing a VFM reactive welding paste;

applying the welding paste in at least one untreated joint area on the first panel and/or second panel operable for joining the first and second panels;

aligning the first and second panels with the welding paste in contact with said first and second panels and holding in contact, wherein a first attachment feature plane of said attachment features on said first panel is spaced from a second attachment feature plane of said attachment features on said second panel such that said first panel attachment features do not overlap said second panel attachment features along said first and second attachment feature planes and said VFM reactive welding paste is located between said first and second attachment feature planes and between respective adjacent attachment features along said first and second panels;

applying predetermined VFM (microwaves) to achieve a predetermined temperature to harden the welding paste to join the first and second panels.

19. The method of claim 18, wherein the welding paste is a 1-component epoxy resin curable by VFM.

\* \* \* \* \*